April 19, 1938.　　　H. M. R. BARJOT　　　2,114,759
DIRECTION SIGNAL FOR MOTOR CARS
Filed Aug. 10, 1934　　　2 Sheets-Sheet 1
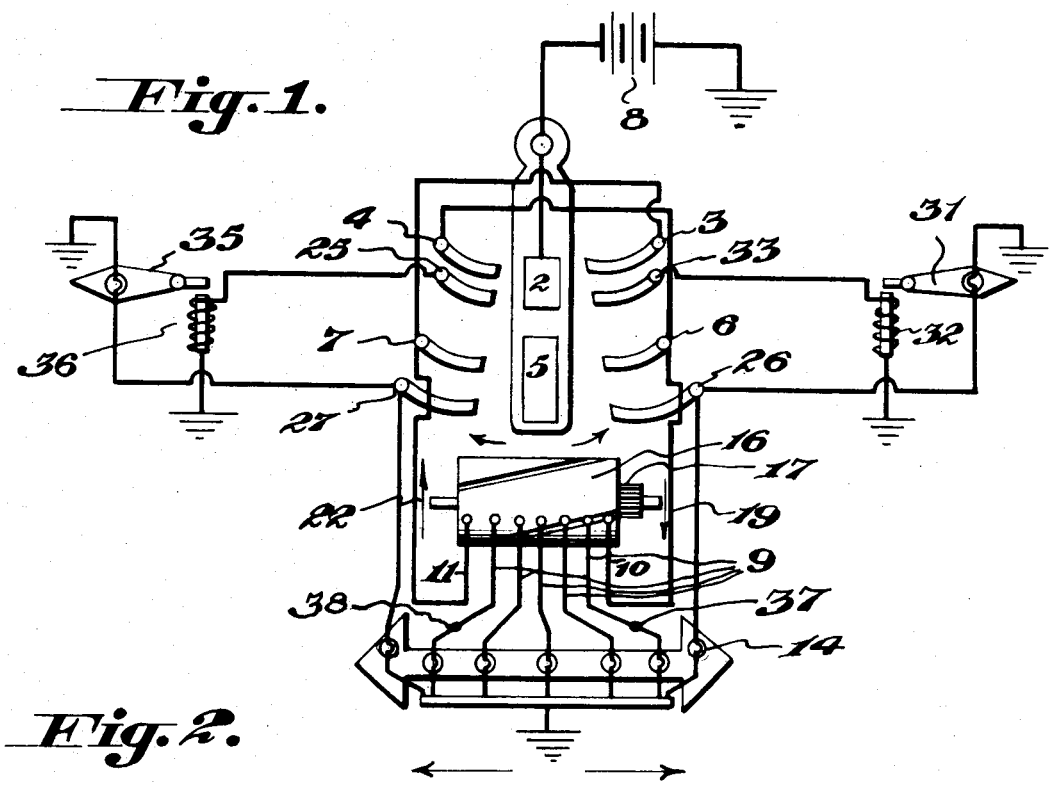
INVENTOR:
H. M. Barjot
BY Wellington B. Johnson
ATTORNEY.

April 19, 1938.  H. M. R. BARJOT  2,114,759
DIRECTION SIGNAL FOR MOTOR CARS
Filed Aug. 10, 1934   2 Sheets-Sheet 2
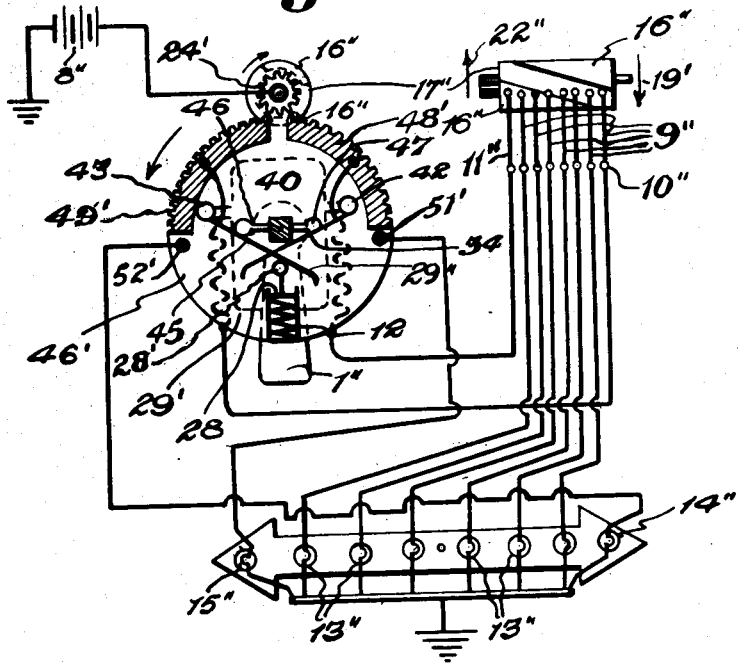
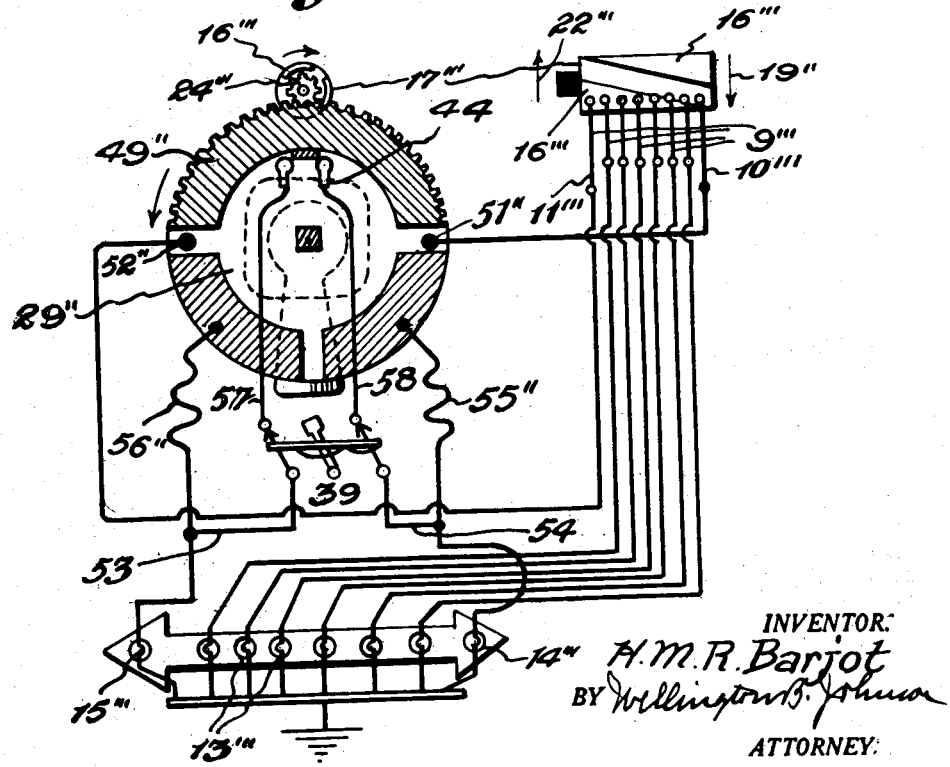
INVENTOR:
H. M. R. Barjot
BY Wellington B. Johnson
ATTORNEY Patented Apr. 19, 1938

2,114,759

UNITED STATES PATENT OFFICE 2,114,759

DIRECTION SIGNAL FOR MOTOR CARS

Henri Marie René Barjot, Paris, France

Application August 10, 1934, Serial No. 739,289
In France August 18, 1933

19 Claims. (Cl. 177—337)

This invention relates to direction signals for motor cars.

One object of the invention is a signal system to be attached to a motor car which shall indicate the direction in which the operator thereof purposes to turn.

Another object of the invention is to provide such a signal that will be easily visible, will plainly indicate the direction of the purposed turn, and will attract the attention of operators of other machines either meeting or following it, as well as that of pedestrians.

Another object is to arrange such a signal comprising a system of electrically lighted lamps, which, by their successive lighting, will indicate the direction of the purposed turn.

Another object of the invention is to provide an electrically lighted arm which, by its motion will supplement the indications of the lights, and will also of itself, indicate the direction of the purposed turning and may be replaced by a simple lamp.

Other objects of the invention relate to mechanically operated controlling switches, to the arrangement of the electric circuits furnishing current to the indicating devices, and to the mounting of the lamps constituting the indicating devices.

Other objects of the invention will in part be obvious and will in part appear hereafter.

The invention accordingly comprises the features of construction, combination of elements, and arrangement of parts which will be exemplified in the construction hereinafter set forth, and the scope of the invention will be indicated in the claims.

In the accompanying drawings I have indicated, somewhat diagrammatically, one manner of carrying out the present invention, and certain modifications of parts thereof, it being understood that the drawings are by way of illustration only, and not by way of limitation.

In the drawings:

Figure 1 is a wiring diagram of one embodiment of my invention.

Figure 2 is a somewhat diagrammatic view of my invention showing a modified form of the switch and the wiring circuits it controls.

Figure 3 is likewise a somewhat diagrammatic view of a modified form of such switch and its operating motor.

Figure 4 is a diagrammatic view of another modification of my invention and system of wiring which it controls.

Figure 5 is a diagram of a modification of the wiring of arm 17'.

I will now describe the invention as set forth in the embodiment of Figure 1.

8 designates an electric battery one pole of which is connected electrically to handle 1 and the other pole grounded on the frame of the machine, as are all grounds herein shown.

1 characterizes the handle of a manually movable controlling switch, and rigidly connected with this handle and movable thereby is contact member 2, electrically connected to battery 8, and contact 5 electrically insulated therefrom.

On the right hand of contact 2, as shown in said figure, are switch points 3 and 33, and on its left hand are two switch points 4 and 25.

On the right of contact 5 are switch points 6 and 26 and on its left, points 7 and 27.

Switch point 3 is electrically connected with point 7, and point 4 with 6. Contact 3 is also electrically connected to brush 11 and point 4, with brush 10, both of which brushes are parts of the central operating switch which comprises a rotatable insulating cylinder 17 carrying helicoidal sectors 16, and is contacted by brushes 11, 9 and 10.

This cylinder is arranged to rotate in both directions, and is rotated in either one, as shown by arrows 19 and 22. This rotation is produced either by a reversible electric motor, by a spring motor, or by any other device which will produce regular rotation in either direction for a period of about 15 seconds, and brought into activity in either direction by movement of handle 1 of the controlling switch. One example of a known form of such motor is shown in Figure 3.

The brushes are arranged to press upon the surface of the rotating cylinder, and brushes 10 and 11 are each connected to a source of illumination in an arrow head, and each of the others to individual electric lamps in the shaft of the arrow, as described below.

Contact points 33 and 25 are connected with the helices of electromagnets 32 and 36, respectively, which helices are in turn, connected to ground. The poles of these electromagnets are so placed with reference to magnetizable projections on the end of arms 31 and 35 pivoted upon the front portion of the car body on each side, that when they are energized, they lift these arms to the horizontal position. Each of these arms carries an electric lamp which is energized through a connection with contact points 26 and 27, respectively, and to ground.

Contact points 27 and 26 are connected to the lamps in the arrow heads, and these lamps are thence connected to ground.

Alternatively, electromagnets 32 and 36 may be energized by current taken from the points 37 and 36, respectively, located in the circuits governing the terminal lamps of the arrow shaft, as shown in Figure 5, and when so connected, the arms oscillate vertically with the lighting and darkening of those lamps.

The double pointed arrow shown at the bottom of Figure 1 and described above as adapted to be secured at the rear of the car may be arranged on an independent support, or attached to the vehicle body, to the trunk usually mounted at the rear of the car body, or may be seated within the body itself, between the outer shell and its lining, suitable holes being made in the shell to enable the lamps to be visible.

Modifications of the above apparatus are shown in Figures 2, 3 and 4, and will now be described.

Figure 2 shows a modification of the central operating switch. This switch is operated by a spring motor which is energized by displacing handle 1' in either direction. This motor also restores said handle to its neutral position.

In this figure, the controlling switch comprises handle 1', mounted on axis 22 which also carries a circular disk 29, of insulating material upon the upper part of which are mounted two quadrants 48 and 49 of conducting material each having teeth cut in its outer periphery.

Above and behind this disk is mounted a second disk 17', which is also of insulating material mounted upon a metallic axle which is connected to battery 8' and which also supports pinion 24, arranged to mesh with the teeth on quadrants 48 and 49, when handle 1' is turned either to the left or to the right, but not to contact them when said handle is in neutral position.

A plurality of metallic sectors 16'—only four being shown—are equally spaced upon disk 17'.

Brushes 9', 10' and 11' are arranged at the upper portion of disk 17', brushes 9' being connected to the lamps in the shaft of the double-headed arrow, brush 10' is permanently connected to quadrant 48 and brush 11' to quadrant 49.

The source of illumination in the left arrow head is connected to brush 52 which contacts disk 29 just below quadrant 49 and that in the right arrow head to brush 51 which contacts disk 29 just below quadrant 48. Disk 29 is returned to neutral position by a reversible motor which is identical with that shown on Figure 3, but is not shown on Figure 2 for the sake of clearness of the drawings.

It follows from this arrangement that when handle 1' is turned to the left, disk 17' will turn to the left also, but when the reversible spring motor is returning handle 1' to neutral position, disk 17' will turn to the right in the direction of the arrow just above pinion 24, until it reaches its neutral position.

A sector 16' will thus first contact brush 11' and so become electrically connected to the battery through pinion 24, sector 49, and further movement will cause the sector 16' to contact in order, brushes 9' and thus the lamps in the arrow will be lighted from left to right, and when finally the sector reaches brush 10', permanently connected to sector 48, the current will flow through sector 48, and brush 51 to the right arrow head, and all the lights in the arrow shaft and in the right arrow head will continue alight so long as brush 11' remains on sector 16', but all will be simultaneously extinguished when said sector has passed beyond that brush.

This lighting and extinguishment will be repeated each time a sector 16' passes brushes 11', 9' and 10'.

Figure 3 shows a modified form of my invention in which the controlling switch shown in Figure 1 has the form of a disk 29' operated for its return movement by a reversible spring motor.

Cylinder 17" of insulating material, is the same as the insulating cylinder shown in Figure 1 and has the same function as that cylinder. It supports a plurality of metallic sectors which are, in this figure, marked 16", and is mounted at right angles to disk 29', upon an axle which has, at one end, pinion 24', so located as to mesh with the teeth of the quadrants 48' and 49' upon that disk when the disk is turned out of its neutral position in which it is shown, but to contact with neither quadrant when it is in the neutral position. The axle of this cylinder is in connection, electrically, with the battery 8", shown in Fig. 1, and, through pinion 24', forms part of the circuit which includes sectors 48' and 49', and the various switches and lamps shown on Figure 1.

In this Figure 3, cylinder 17" is shown in end view behind disk 29', and also diagrammatically, in front view at the right side of the figure, with wire terminals 10", 9" and 11" resting upon its surface. Wire terminals 10" and 11" are permanently electrically connected, respectively, with sectors 49' and 48', and switches 9" with the various lamps in the shaft of the arrow.

Resting in contact with insulating disk 29', just below the quadrants, are wire terminals 51' and 52', connected, respectively, with the left and right sources of illumination in the double headed arrow. 40 is a plate, secured in fixed position, which supports the operative parts of the control device. Short arms are attached rigidly at each side of this plate and carry posts 42 and 43 respectively. Arms 34 and 45 are rigidly attached at one end to these posts, and directed to cross each other below the axle which carries operating arm 1" and have their outer or free ends curved downwardly. Mounted upon operating handle 1" is a cylinder 12 having one end closed, and a piston 28 slidable therein and held in extended position by resilient means, shown, by way of example, as a coiled spring, although any other resilient means, as a gas, may replace the spring. This piston carries a short rod whose outer end carries a head 28.

It is readily seen that when handle 1" is turned to either side, piston 28 is forced into cylinder 12 by contact with arms 34 or 45 and that when the force which causes said movement ceases the resilience of the spring in cup 12 working against said arms will return handle 1" and disk 29' to its neutral position.

The motion of handle 1", when it is manually moved in either direction occupies but a fraction of a second, and if the motion be toward the right as in Figure 3, sector 26' will rotate cylinder 17" in the direction shown by arrow 19' at its right hand end.

This will occasion a rapid flashing of lights in the left hand portion of the arrow from left to right of such short duration, however, as to cause no trouble.

As handle 1" and disk 29' return to neutral position, cylinder 17" rotates in the reverse direction, but more slowly because the small spring motor which moves it cannot drive it rapidly.

So long as sector 48' is in contact with pinion

24″, current will flow to brush 11″, thence, so long as said brush contacts with a metallic sector 16″, over said sector successively to the lamps from left to right in the arrow and finally when brushes 11″ and 10″ are both in contact with the same sector, to the source of illumination in the right arrow head, the current in this case reaching said lamps through the conductor leading from brush 10″ to sector 49′ through brush 52′.

When rotation of cylinder 17″ removes brush 11″ from sector 16″ all the lamps in the arrow are extinguished, but are relighted in this same order so long as sector 49′ is in contact with pinion 24′.

Figure 4 shows a second modification of the controlling switch, in which the controlling switch comprises a rotatable disk of insulating material, mounted upon an axle which also carries an operating handle for said disk. The supporting plate and the operating handle of this switch carry a spring reversing motor in all respects identical with that shown in Figure 3, but not shown in this figure.

Upon the upper portion of said disk, as shown in Figure 4, there is secured a semi-circular sector 49″ of conducting material, having teeth upon its upper edge, which teeth are adapted to engage a pinion 24‴, mounted upon the axle of cylinder 17‴, and in connection with one pole of a battery. The lower portion of the disk is occupied by two plain metallic quadrants 55″ and 56″, separated from each other and from the semi-circular arc on the upper part of the disk, but in permanent connection with the source of illumination in the right and left arrow heads. Between the upper semi-circular arc and the lower quadrants brushes 51″ and 52″ rest, and are connected with brushes 10‴ and 11‴, respectively, which rest upon cylinder 17‴.

The left hand arrow head is also connected with the semi-circular arc by connector 57, and the right hand one, by connector 58, through manually operated switch 39 and automatic circuit breaker 44.

Cylinder 17‴ of Figure 4 is identical in structure and function with cylinder 17″ of Figure 3, and is shown in the same two positions as that cylinder.

Brushes 9‴, 10‴ and 11‴ correspond to brushes 9, 10 and 11, respectively, of Figure 1. Brushes 11‴ can be placed in connection with the battery through brush 52″ and sector 49″ and brush 10‴ through brush 51″ and said sector 49 which is in permanent connection with the battery through the pinion mounted on the axle of cylinder 17‴ and meshes with said sector.

The left hand quadrant 56″ on the lower part of the disk is in permanent electric connection with the source of illumination in the left arrow head, and the right-hand quadrant 55″ with that in the right hand quadrant.

The sources of illumination in these arrow heads are also directly connected with the battery through connectors 57 and 58, manually operated switch 39 and circuit breaker 44, when the handle controlling the disk is in neutral position. By this means, the arrow heads may be used as parking lights. As soon as the handle is moved either to right or left, circuit breaker 44 opens the circuit, and the source of illumination in the arrow heads can then obtain current only through quadrants 55″ and 56″.

In place of the arrow heads being constructed with several lamps as shown in Figure 1, the arrow head may be a large box of the proper shape, or, in fact, of any convenient shape, and furnished with a cover having an aperture of arrow head shape, and illuminated by a single large lamp. This box may carry a mirror at its rear, to serve to diffuse the light of the lamp.

Instead of a long block of insulating material having a plurality of sockets for lamps, each lamp may be mounted in its individual socket, either within a small block of insulating material, or otherwise.

The operation of the arrangement shown in Figure 1 is as follows:

Lever 1 of the controlling switch is shown in the neutral position, in which all the lamps are dark. Assume that this lever is moved to the right. In this position, contact member 2 will rest upon contact points 3 and 33 and bridging contact 5 upon points 6 and 26. The movement of the handle will set cylinder 17 in rotation in the direction indicated by arrow 19, and during the continuance of this rotation, the handle will return to its neutral position, the rotation continuing for about 15 seconds.

Under these conditions current will flow through contact member 2 to contact point 3 and the connecting wire to brush 11.

When, owing to the rotation of cylinder 17, this brush contacts helicoidal section 16, and, as brushes 9 successively contact that sector, the lamp with which each is connected will glow, and continue to glow until brush 11 has passed to the surface of the cylinder, between successive sectors 16, when they will be simultaneously extinguished. Regarding the arrow shown in this figure, then, the lamps in its shaft will glow in order from left to right, and, as the brush 11 passes off the sector will be simultaneously extinguished, and this glowing and darkening will continue in the same order so long as cylinder 17 continues to rotate.

At the same instant as contact member 2 contacts contact point 3, bridging contact 5 contacts point 6 which is in connection with point 4 on the left of the handle, and this, in turn, is connected with brush 10 which rests upon the right end of cylinder 17. Consequently, when brush 10 contacts the sector 16, current will flow from 11 across the sector to 10, then by way of 4, bridging contact, contact point 26 to the right hand arrow head and as soon as brush 11 leaves the sector the current is interrupted and the lamps, both those in the arrow shaft and the head are extinguished.

In the right hand position of the handle, contact member 2 is also in contact with point 33 and the electric current therefore energizes electromagnet 32 and raises arm 31 to the horizontal position, and continues it in that position so long as the handle remains in contact with point 33.

Also, when the handle is in the right hand position, bridging contact 3 rests upon point 26 which is in electrical connection with a lamp in arm 31, and therefore causes its illumination, together with the group of lamps in the right hand arrow head.

In the arrangement of circuits shown in Figure 1, electromagnets 32 or 36 are energized so long as contact member 2 rests upon 33 or 25, respectively, and arms 31 and 35 remain in horizontal position for the same period, while the lamps glow or darken simultaneously with those in the arrow heads.

When the modified arrangement which involves connecting electromagnets 36 and 32 to points 37 and 38 on the circuits of terminal lamps 13 is used, arms 31 and 35 will oscillate in a vertical direction, and only when these lamps are active.

The modification shown in Figure 2 operates as follows:

Let handle 1' be turned to the right. This places quadrant 49 in electrical contact with the battery through pinion 24, which is rotated to the left, along with disk 17'. The reversible motor arranged in this figure as in Figure 3, but not shown here to avoid obscuring other parts of the apparatus, immediately begins to return the apparatus to neutral position. Disk 17' turns to the right.

A sector 16' first contacts brush 11', then, in succession brushes 9', and current flows from the battery 8' to pinion 24, sector 49, brush 11' and along sector 16' to each lamp in the arrow shaft in succession, and when said sector 16' contacts brush 10' to quadrant 48, then to brush 51 and the right arrow head.

When sector 16' loses contact with brush 11' all the lamps, both in the arrow shaft and the right head, go out, and this order of illumination and simultaneous extinction is repeated until handle 1' returns to its neutral position.

The operation of the modification shown in Figure 3 is easily seen from that figure. In the neutral, or as shown, vertical, position of handle 1', all the lamps on all the indicators are without current and dark.

If this lever be turned in either direction, the motor is set in action to return it to its neutral position, and, as it returns, cylinder 17' is rotated by means of the teeth on the sector with which it is in contact.

It should be noted that this manual motion of the lever 1' occupies but an instant of time, so short that no appreciable, at least no important, illumination of the lamps occurs.

Assume that lever 1' has been turned to the left hand position, so that quadrant 48' has been turned to the right, and that disk 29', together with the lever, is being rotated in the direction of the arrow shown on its left, by quadrant 49', and cylinder 17" in the direction of the arrow shown above it, then, first, wire terminal 10" will contact sector 16" on the cylinder, then, in succession, wire terminals 9" from right to left, and, finally, wire terminal 11".

Since cylinder 17" performs several rotations while the disk moves the progressive lighting and simultaneous extinguishing of lamps in the arrow will be repeated, thence to quadrant 48' and through brush 51' to the left hand arrow head source of illumination which then illuminates and remains alight so long as brushes 10" and 11" both remain in contact with the same sector.

When quadrant 49' comes to rest, or when brush 10" leaves sector 16", all the lamps both in the arrow head and shaft are extinguished.

When lever 1' has been turned to its right hand position, and is being returned to its neutral one, quadrant 48' rotates pinion 24' and cylinder 17" in the direction opposed to that shown by the arrows, and the same phenomena as above described follows in the reverse order.

Figure 5 shows a modification of the wiring of the electromagnet controlling arm 35 on the left side of the car. In this modification the coil of magnet 36 leads from point 38, on the wire leading from brush 9 to the left hand lamp in the arrow shaft, so that, instead of arrow 35 rising to the horizontal position and remaining there so long as handle 1 remains in left hand position, this arm rises and falls as this lamp glows and darkens. Electromagnet 32, of course, obtains its current from point 37 on brush wire 10, and operates in the same way.

Since certain changes may be made in the above construction and different embodiments of the invention could be made without departing from the scope thereof, it is intended that all matter contained in the above description or shown in the accompanying drawings shall be interpreted as illustrative and not in a limiting sense.

What I claim is:

1. In a direction indicating assembly for motor vehicles, a circular disk of insulating material, manually operated means for rotating the said disk to either side of its neutral position, two metallic quadrants having their outer peripheries toothed, and both arranged on the same side of the disk, and on the same side of a diameter thereof, but separated from each other, a battery, a rotatable cylinder of insulating material mounted on an axle which is electrically connected with the battery, and carries on one end a pinion adapted and arranged to mesh with the teeth on the outer periphery of the said quadrants, when the said disk is on either side of its neutral position, but separated from both quadrants when in its neutral position, and means, operable to restore the disk to its neutral position when it has been displaced therefrom.

2. A direction indicating assembly for motor vehicles comprising a rotatable disk of insulating material secured in convenient position upon said vehicle, a plurality of metallic quadrants mounted upon one side of said disk, said quadrants having toothed outer peripheries, a double headed arrow suitably mounted on the vehicle, illuminating means in each head of the arrow, a rotatable cylinder of insulating material carrying helicoidal metallic segments and operable by the toothed quadrants, a brush resting upon the surface of said cylinder at each end, and each in permanent connection with a separate quadrant, a brush resting upon the surface of the disk when the latter is in its neutral position, and in electric connection with a group of lamps in one of the arrow heads, whereby, when said disk has been displaced from its neutral position and is being returned thereto, said group of lamps is alternately alight and dark.

3. In a direction indicating assembly for motor vehicles, a rotatable disk of insulating material, means for rotating said disk in either of two directions and returning it to neutral position, a semi-circular metallic arc upon a face of the disk, separate metallic quadrants mounted upon the same face of the disk and separated from each other and from the semi-circular arc, said semi-circular arc having teeth upon its outer periphery, a double headed arrow suitably mounted upon the vehicle, a group of lamps in each arrow head, a rotatable cylinder of insulating material which carries a plurality of helicoidal metallic sectors upon its surface and separated from each other, a pinion upon the axle of said cylinder and arranged and adapted to mesh with the teeth upon the said rotatable disk, a brush resting upon the surface of said cylinder at each end, a brush resting between the semi-circular arc and a quadrant at each end of said arc when said disk is at rest, and each in permanent connection with a brush resting at an end of the cylinder, a permanent electrical connection between each quadrant and a lamp group in an arrow head, whereby, when the said disk is returning to its neutral position after having been displaced therefrom, the group of lamps in one arrow head is alternately alight and dark.

4. In the assembly of claim 3, electric connection between the lamps in each arrow head and the semi-circular metallic arc upon the said rotatable disk, means for automatically breaking said circuit connection when the said disk is rotated from its neutral position, and manually operable means for breaking such connection when said disk is in neutral position, whereby said arrow heads serve as parking lights at the will of the operator.

5. In a direction signal for motor cars, a horizontal row of lamps fitted out at both ends with an arrow head having electric illuminating means, independent circuits for each of the electric illuminating means, a source of electricity, a hand operated device which can be moved in either of two opposite directions from a neutral position and which in either way energizes a spring motor, said spring motor operating a rotatable cylinder disk fitted with several simple peripheric conducting sectors on which press a plurality of brushes incorporated in the lamp circuits, one brush for each lamp having a linear respective disposition similar to that of the lamps in the row, an end brush at each end of the brush line, each one fitted with a proper switch controlled by the hand operated device with mechanical arrangement so that when the hand operated device is thrown on the right, the rotatable cylinder is caused to rotate in a direction, clockwise or anti-clockwise corresponding to a progressive touch of the brushes in the order left-right of the lamps in the row and the switches of the end brushes are operated in such a way as to connect with the source of electricity that one which is first touched by the rotating sector and with the right electric illuminating means the other end brush, means for automatically restoring the hand operated device to its neutral position by the spring and thereby breaking the circuits, and means for reversing the whole combination of rotation and contacts when the hand operated device is thrown to the left.

6. In a direction signal for motor cars, a source of electricity, a double throw electric switch, a reversible motor, means to throw the switch in either direction, and means to set the motor into motion to drive it in a reverse direction to restore the switch to its neutral position, a rotary rotatable electric switch driven by the motor, a double headed arrow supporting lamps spaced apart in the shaft and electric illuminating means in each head thereof, each lamp in the shaft and each said electric illuminating means being on an independent circuit, and each of said circuits controlled by said rotating electric switch member, the above described devices being adapted and arranged to light the individual lamps in the shaft, then the electric illuminating means in the arrow head, successively in the direction indicated by the throw of the switch and to maintain each lamp alight until the electric illuminating means in the arrow head are lighted and all darkening simultaneously.

7. The apparatus described in claim 6 in which the motor is a reversible spring motor.

8. In a direction signal for motor cars, a source of electricity, a double headed arrow supporting incandescent electric lamps spaced apart in its shaft and electric illuminating means in its heads, each said lamp in the shaft and each electric illuminating means in the heads being on a separate electric circuit, and means for successively illuminating each shaft lamp from either end of said shaft toward the opposite head and finally the head, for maintaining all these lighted lamps glowing an appreciable time and simultaneously extinguishing them.

9. In a direction signal for motor cars, a double headed arrow supporting incandescent electric lamps spaced apart in its shaft and groups of such lamps connected in parallel in each head, each shaft lamp and each group of lamps in the arrow head being on independent circuits, a double throw switch connected thereto, having a plurality of contact points on each side, a reversible motor, a cylindrical rotary member constructed of insulating material and having upon its periphery longitudinally arranged helicoidal segments of conductive material, and adapted and arranged to be driven in rotation by said motor, brushes of said independent circuits of the lamps in the arrow shaft contacting its surface in a line parallel to its axis, other wire terminals each electrically connected to contact points at opposite sides of the double throw switch at each end of said line of wire terminals, whereby, when said rotary member rotates in either direction, the lamps in the arrow shaft will be illuminated in the corresponding direction from one end of the shaft to the other and simultaneously extinguished.

10. In a direction signal for motor cars, a source of electricity, a double throw switch connected thereto and having a plurality of contact points on each side thereof, and carrying an insulated bridging plug, and a plurality of contact points on each side arranged to contact with it, a rotary cylindrical body arranged across the neutral line of said switch carrying a series of helicoidal sectors longitudinally disposed and circumferentially spaced apart thereon, conductors of electricity leading respectively from a contact point on one side of said switch to a brush contacting at the opposite end of the cylindrical body, other conductors of electricity leading respectively from the first contact point on one side of the switch to a contact point of the bridging plug located on the opposite side thereof, other conductors of electricity leading respectively from a second contact point of the bridging plug on the one side thereof to the electric illuminating means in the correspondingly disposed head of the double headed arrow, whereby, when the switch is thrown on the contact points at one side, the lamps in the corresponding arrow head will be illuminated so long as the above-recited brushes both contact with the same helicoidal sector and are darkened when the first brush to contact said sector loses such contact.

11. In a direction indicator for a motor car, a source of electricity, a double throw switch connected thereto and carrying an insulating bridging plug, a reversible spring motor energized by the movement of said switch, a rotary cylinder of insulating material having helicoidal sectors longitudinally arranged and circumferentially spaced apart upon its surface, and arranged to be rotated in either direction by said motor, a double headed arrow having lamps longitudinally spaced apart in its shaft and electric illuminating means arranged in each arrow head, each shaft arrow having a brush which contacts with the surface of said cylinder along a line parallel to its axis, brushes contacting said cylinder at each end of said line of shaft lamp terminals and connected, respectively, with a contact point at each side of said switch and at the opposite side of said bridging contact, wires leading respectively from the electric illuminating means in each arrow head to a second contact point on the same side of the bridging contact, whereby, as the said cylinder rotates the several brushes contacting its surface will progressively contact and pass off a helicoidal segment in the same order and the shaft lamps be successively illuminated from one end to the other and finally, when both end brushes contact with the same sector the lamps in that arrow head toward which the shaft lamps' illumination has progressed, and when the first contacting brushes has ceased contact with the sector, the lamps will simultaneously darken.

12. In a direction indicator for motor cars which comprises a source of electric current, a double-throw switch connected therewith having a plurality of contact points on each side thereof, and carrying a bridging contact having also a plurality of contact points on each side thereof, a double headed arrow supporting a series of incandescent electric lamps in its shaft and a group of such lamps in each head, and means comprising a single switch contact point on each side of said switch and two bridging contact points on one side of said bridging contact and a rotatable cylindrical body carrying a plurality of helicoidal sectors and brushes arranged in the circuit of said lamps for illuminating successively the lamps in the arrow shaft from one direction to and including the group of lamps in the succeeding arrow head in recurring cycles, arms pivoted on each side of the car for motion in a vertical plane, and electromagnetic means associated with said arms to swing them into horizontal position, the electromagnetic means, on the side of the car on which lies the illuminated arrow-head, deriving current directly from said single, independent switch contact point during the entire period of a cycle of illumination and extinction of the arrow lights.

13. In the assembly of claim 12, the modification which consists in an electric lamp in each pivoted arm and means for deriving current therefor from the circuit of arrow head lamps on the same side of the car, whereby the arms will remain stationary in the horizontal position during the recurring cycles of illumination and darkening of said group of lamps, but the lamp in said arm will be illuminated and darkened simultaneously with said group of lamps.

14. In a direction signal for motor cars comprising a double headed arrow supporting incandescent electric lamps arranged apart in its shaft and means for successively illuminating them from one end to the other and simultaneously darkening them, and arms disposed on each side of the car and pivoted for motion in a vertical plane, electro-magnetic means arranged to elevate said arms to a horizontal position, means for electrically energizing each said magnet from the circuit of the shaft lamp on the same side of the machine, whereby the pivoted arms will vibrate in the vertical plane, so long as the cycle of illumination and darkening of said lamps continues.

15. In a direction indicating assembly for motor vehicles, an operating switch comprising a rotatable body of insulating material, rotatable independently in opposite directions, a single set of separate helicoidal metallic sectors mounted on said rotatable body, means independent of the operative elements of the vehicle for rotating said body in either of said opposite directions for a definite period, brushes arranged to contact with the said metallic sectors, and the surface of the rotatable body and a series of lamps, each in electrical circuit with said brushes, said helicoidal metallic sectors being adapted and arranged to contact said wire terminals in order and to maintain said individual contacts until all have been contacted and the first wire terminal to contact has lost said contact.

16. In a direction indicating assembly for motor vehicles, an operating switch comprising a rotating cylinder of insulating material, means for rotating said cylinder in either of two opposite directions, at least one helicoidal metallic segment upon the surface of said cylinder, and a multiplicity of contact elements arranged to press upon said cylinder in a straight line parallel to its axis, the helicoidal sector being so arranged that the contact elements contact it one by one, in order from one end to the other, and of such width that each said element shall remain in contact therewith until the first element has broken its contact.

17. In a direction assembly for motor cars, a source of electricity, a double headed arrow carrying at least a single row of incandescent electric lamps spaced apart in its shaft, and a source of electric illumination in its head, each such lamp in the shaft and the source of electric illumination in the head being on a separate electric circuit, and means for successively illuminating each shaft lamp from either end of said shaft toward the opposite head, finally the source of electric illumination in the head, means for maintaining all these lamps lighted for an appreciable time and for simultaneously extinguishing them all.

18. In a direction signal for motor cars, a horizontal row of lamps fitted out at both ends with an arrow head having electric illuminating means, independent circuits for each illuminating means, a source of electricity, a power operated switch mechanism controlled by a hand operated device, means when said hand operated device is thrown to the right for successively illuminating the lamps in the row from left to right and afterwards the illuminating means of the right arrow head, means for maintaining each lamp alight after it has been illuminated until the illuminating means has been illuminated, means for keeping the left illuminating means from illumination, means for simultaneously extinguishing the lamps in the row and the right illuminating means, means for renewing the same signal several times in succession in the same direction, and means whereby, when the hand operated device is thrown to the left, a similar signal is produced with a reverse sequence of illumination of the lamps in the row and with a final lighting of the left illuminating means while the right is kept extinguished.

19. In a direction signal for motor cars, a horizontal row of lamps fitted out at both ends with an electrical illuminating means, independent circuits for each of said lamps and for said electrical illuminating means, a source of electricity, a hand operated lever which can be moved in either of two opposite directions from a neutral position and which in either way energizes a spring motor to return said lever to its neutral position, said spring motor operating in either way a rotatable switch cylinder fitted with a plurality of helicoidal conducting sectors on which press a plurality of brushes incorporated in the lamp circuits, said brushes having a linear respective disposition along said cylinder corresponding to that of the lamps in the row, and to that of said electrical illuminating means at the end of the row, so that when the hand operated lever is thrown in either direction, the rotatable cylinder is caused to rotate, thus causing a progressive contact of the brushes in the order of the lamps in the row, and of the end electrical illuminating means.

HENRI MARIE RENE BARJOT.